United States Patent [19]

Kafka

[11] Patent Number: 5,205,973
[45] Date of Patent: Apr. 27, 1993

[54] PRECOAGULATION PROCESS FOR INCORPORATING ORGANIC FIBROUS FILLERS

[75] Inventor: Fred Y. Kafka, Louisville, Ky.

[73] Assignee: E. I. Du Pont de Nemours and Company, Wilmington, Del.

[21] Appl. No.: 784,100

[22] Filed: Oct. 28, 1991

Related U.S. Application Data

[63] Continuation of Ser. No. 429,439, Oct. 31, 1989, abandoned.

[51] Int. Cl.⁵ .................. B29C 47/00; B29C 47/76
[52] U.S. Cl. .................................. 264/101; 264/141; 264/211; 264/349; 523/333; 523/335; 523/340; 523/352; 524/572; 524/575; 524/577; 528/502
[58] Field of Search ............... 264/101, 102, 211, 141, 264/211.12, 349; 523/332, 333, 334, 335, 340, 352; 524/572, 575, 577; 528/501, 502

[56] References Cited

U.S. PATENT DOCUMENTS

| 3,035,006 | 5/1962 | Hanmer et al. . |
| 4,136,251 | 1/1979 | Bice et al. ................... 528/502 X |
| 4,263,184 | 4/1981 | Leo et al. . |
| 4,588,780 | 5/1986 | Edwards et al. ............... 525/184 |

FOREIGN PATENT DOCUMENTS 58-183235 10/1983 Japan .
2138430 10/1984 United Kingdom .

*Primary Examiner*—Leo B. Tentoni

[57] ABSTRACT

Incorporation of fibrous filler into a styrene-butadiene rubber (SBR) by mixing a fibrous filler, SBR latex and a coagulant, feeding the resulting coagulated fiber-filled SBR latex to a dewatering extruder and through a flow restriction that applies back pressure sufficient that water present in the SBR is forced out of a vent upstream from the flow restriction and discharging the fiber-filled SBR from the extruder.

5 Claims, 3 Drawing Sheets

PRECOAGULATION PROCESS FOR INCORPORATING ORGANIC FIBROUS FILLERS

This is a continuation of Ser. No. 07/429,439 filed Oct. 31, 1989, now abandoned.

BACKGROUND OF THE INVENTION

This invention relates to a process for incorporating fibrous filler into styrene-butadiene rubber.

Fibrous fillers have been incorporated into plastics and elastomers for the purpose of providing additional strength to articles fabricated from the polymers, obtaining good surface contact properties for articles such as power transmission belts, and reducing compound cost by serving as low cost fillers. Fibrous fillers have been added to plastics and elastomers by heating the polymers to soften them and thoroughly mixing the polymer and filler on a mill or in an internal mixer. This procedure has inherent drawbacks when fibers are incorporated in certain elastomers. The need for incorporating fibers into elastomers is critical for many uses of articles fabricated from elastomers such as, for example, power transmission belts, tires, etc. The procedure now used on a commercial scale by the fabricator is to mix the solid uncured elastomer with the fibrous filler in a BANBURY mixer or on a rubber mill. Mixing is continued for about 5 to 10 minutes. After that time mixing must be discontinued for a substantial amount of time because the elastomer becomes overheated, which, if mixing is continued, would degrade the elastomer and result in substantial lowering of the important properties of the elastomer and/or scorching of the stock. When the mixture of the elastomer and fiber overheats, it must be cooled before mixing is continued. This procedure of mixing to incorporate the filler in the elastomer and cooling due to heat build-up may require as many as six sequences. Moreover, progressive working of the rubber can produce an unusable scorched product before an adequate mix is even possible, especially with aramid fibers in commercial scale mixers when cooling capacity is limited. The incorporation of the fibrous fillers into the elastomer by prior art methods is both energy intensive and expensive due to the long times required by the fabricator to incorporate fiber into the elastomer. The present invention provides a process for incorporating organic fibrous fillers into a styrene-butadiene rubber which is economical, readily accomplished and minimizes the dispersive work necessary to achieve a given compound quality.

SUMMARY OF THE INVENTION

The present invention is directed to a process for incorporating fibrous filler into a styrene-butadiene rubber which comprises:

(a) mixing a styrene-butadiene rubber latex, about 1–400 parts by weight organic fibrous filler per 100 parts styrene-butadiene rubber and a coagulant for the styrene-butadiene rubber latex to form a coagulated fiber-filled rubber (b) feeding the coagulated fiber-filled styrene-butadiene rubber to a dewatering extruder and through a flow restriction in the extruder that applies back pressure sufficient that water present in the coagulated fiber-filled styrene-butadiene rubber is forced out of a vent provided in the extruder upstream from the flow restriction, and (c) discharging the organic fiber-filled coagulated styrene-butadiene rubber from the extruder.

The resultant fiber-filled styrene-butadiene rubber is useful for the manufacture of power transmission belts, conveyor belts, or tires.

DETAILED DESCRIPTION OF THE INVENTION

Figure 1:
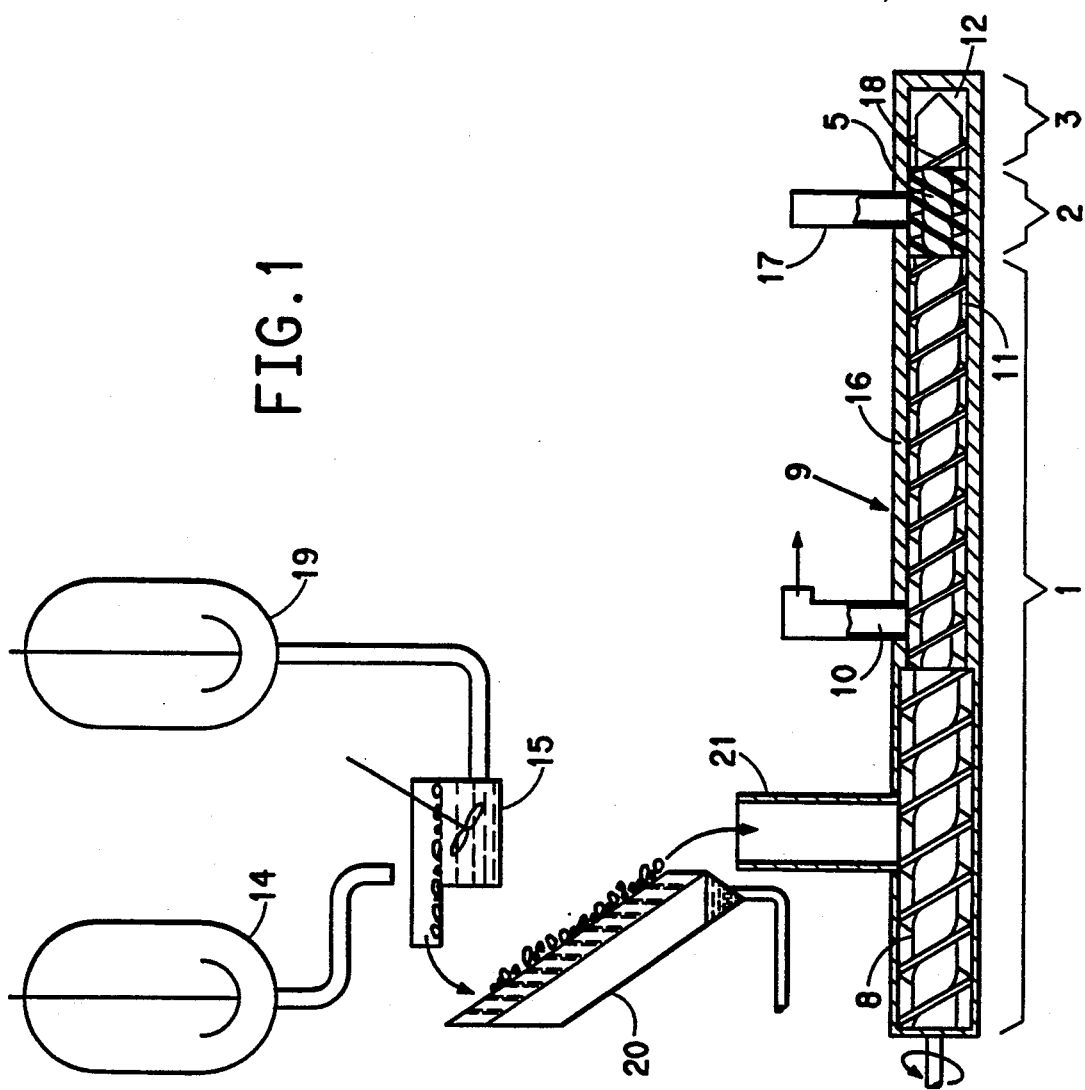
FIG. 1 is a partially diagrammatic, sectional side view of a dewatering extruder used in the process of this invention.

The styrene-butadiene rubber (SBR) used in the process of this invention must be in the form of a latex. Generally, the latex has a solids content of about 10–80%, usually about 35–75%. Conventional emulsifying agents are mixed with the monomers prior to polymerization. The latex particles consist of aggregates of the SBR protected by the emulsifying agent, e.g., rosin soaps, which are absorbed on the surface of the particles.

Styrene/butadiene rubber latices are well known in the art. These elastomer latices are prepared by polymerizing an emulsion of generally, from 60 to 75 parts by weight butadiene, from 25 to 40 parts by weight styrene, from 1 to 5 parts by weight emulsifying agent, from 0.1 to 1.0 parts by weight polymerization catalyst, from 0.1 to 1.0 parts by weight modifying agent and 100 to 300 parts by weight water, at 40° C. to 60° C.

The organic fibrous filler incorporated in the SBR can be a natural or synthetic fiber such as cotton, cellulose acetate, polyamides, polyaramids, and polyesters. Preferred fibers are cotton and the polyaramid, poly(-paraphenylene terephthalamide) e.g., KEVLAR® aramid pulp. The length of the fibers used in the process of the invention is not critical because when mixed and coagulated with the SBR, the fiber-containing SBR forms a crumb and, therefore, entanglement when the material is fed to the dewatering extruder is not a problem. Fibers having lengths of 150 mm or longer can be used with substantially the same results. Usually, fibrous fillers of from about 0.02–6 mm in length, preferably, 0.3–3 mm are used in the process of the invention. Smaller lengths are also satisfactory but generally the fibers are not less than about 0.3 mm in length due to the cost of further size reduction without increase in benefit. The diameter of the organic fibrous filler is usually narrower than its length. In general, diameters can vary widely but are usually from 8–50 microns. Cotton fibers have typically, diameters about 12–18 microns and KEVLAR® aramid pulp about 12–17 microns. Generally, the length to diameter ratio can be expressed as follows: L:D > 10, the longer length fillers providing better reinforcement of the fabricated article.

The amount of organic fibrous filler added to the SBR latex, substantially all of which is incorporated in the rubber, varies depending on the particular use contemplated. Generally, amounts between about 1–400 parts fibrous filler per 100 parts SBR are added, and usually the organic fibrous filler is fed to the SBR latex in amounts of from about 5-100 parts fibrous filler per 100 parts SBR. For the manufacture of articles to be used in dynamic applications, e.g., power transmission belts and tires, the final fiber concentrations are of the order of about 5-30 parts fiber per 100 parts rubber. Such loadings can be obtained directly by this process or a more concentrated masterbatch can be prepared for further let down with rubber by the final user.

The SBR latex can be preblended with an aqueous slurry of fibrous filler or dry fibers can be blended with the SBR latex. The aqueous fiber slurry can be prepared using either conventional low shear mixers such as propeller or turbine devices or high shear mixers. Thickeners are not necessary but, if desired can be added to the slurry to increase dispersive shear stress for a given mixing device, to help prevent subsequent settling and as an aid to ultimate latex/slurry coagulation. The preferred coagulant for the SBR latex is an aqueous solution of calcium chloride. The concentration of such a solution can be as low as about 0.1% or as high as about 10%. The fiber can be dispersed into the coagulant instead of the latex, although such procedure is not preferred, since initial fiber takeup by the coagulating rubber may depend on the concentration of fiber in the coagulant, which may not yet have accumulated to its final steady value. Other compatible additives, such as processing oils, carbon black and dyes may be added to the slurry or latex to be incorporated into the coagulated SBR rubber. Conventional mixing techniques can be used when blending the SBR latex with the aqueous fibrous slurry or dry fibers.

It is necessary to first coagulate the SBR latex containing fiber before it is fed to the extruder. This is accomplished, for example, by mixing the aqueous SBR latex slurry with a coagulant with agitation. The latex and coagulant can be combined by adding a stream of latex to a vessel equipped with agitation means containing the coagulant. Suitable coagulants used in the present process that are mixed with the fiber-filled SBR latex include aqueous solutions of salts such as calcium chloride, aluminum sulfate, sodium chloride, sodium sulfate, or sodium acetate. Cationic soaps such as polyoxypropylene methyl diethyl ammonium chloride (EMCOL CC-9) and aqueous polyamine solutions can also be used, either alone or in conjunction with salts, to neutralize anionic surfactants sometimes used to stabilize the fiber-filled SBR latex.

The coagulated elastomer latex can, if desired, be drained and/or water washed and then fed to a dewatering extruder where it is mixed and fed to a dewatering zone. The fiber-filled coagulated SBR is fed through the dewatering zone until it contacts a flow restriction, e.g., a pressure seal or a restrictive die or a valve. The flow restriction squeezes water out of the SBR crumb. The particular pressure applied to the SBR as it passes through the flow restriction depends on the flow rate, restriction design, screw speed and compound viscosity. Substantial amounts of water are separated from the coagulated SBR as it passes through the flow restriction that applies back pressure and water is removed in the dewatering zone through a vent or barrel slots upstream from the flow restriction either before or after the various feed points.

The fiber-filled coagulated SBR can be discharged from the extruder and subsequently dried to remove excess liquid. Alternatively, the extruder can be provided with a subatmospheric pressure zone 7 downstream from a pressure seal flow restriction for removal of remaining water from the coagulated SBR by vacuum. The coagulated SBR exiting the flow restriction is fed to a subatmospheric pressure zone to remove water from the rubber to substantially dry the rubber before it is discharged.

It should be understood that the particular apparatus described herein is but one type dewatering extruder that can be used to conduct the process of the present invention. Other suitable dewatering screw extruders used commercially to remove water from SBR that contain horizontal barrel slots from which water is removed as it passes through the screw extruder can also be used. Also, a series of extruders can be used to conduct the process described in the present invention.

Figure 2:
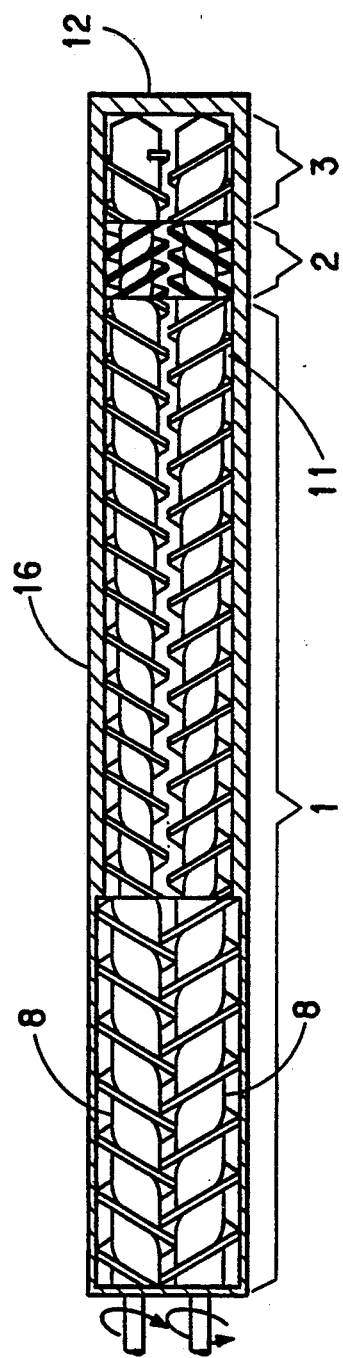
FIG. 2 is a simplified, sectional top view of the dewatering extruder screws, showing the arrangement of their flights.

Referring to FIG. 1, 14 is a feed tank containing, e.g., a mixture of SBR latex and an aqueous slurry of organic fibrous filler; 19 is a feed tank containing coagulant; 15 is a coagulation mixer containing a coagulant for SBR, such as aqueous calcium chloride; 20 is a shaker screen for removal of excess water by drainage through the screen; 9 is a dewatering extruder provided with entrance port 21; 16 is a twin-screw extruder housing containing screws 8, as shown in FIG. 2. The extruder is divided into the following three zones; 1, the liquid separation zone; 2, the flow restriction zone; and 3, the polymer removal zone. As can be seen in FIG. 1, toward the downstream end of zone 1 the screw channels 11 can be made more shallow to provide a pumping action toward pressure seal 5 that functions as a flow restriction. The pressure rises high enough to force the low viscosity fluid (water) to move counter to the screw movement. Waste liquid is removed through vent 10. To prevent loss of polymer with the waste liquid, a mechanical dewatering device can be installed at that point. This can be, for example, a twin-screw mechanism, which returns polymer to the extruder. An automatic valve may be provided in the waste liquid exit line to maintain the desired pressure at the upstream end of zone 1. The flow restriction, e.g., pressure seal 5, may be one of several devices known to those skilled in extruder technology for providing a high back pressure, a valve or restrictive die. Shown in the figures are reverse pitch screw flight sections which are often used for this purpose. The extruder may also be equipped with barrel valve 17 to relieve pressure developed by the pressure seal and control extrudate moisture and/or temperature. Downstream from the pressure seal, if desired, the extruder can be fitted with an additional length of conveying screws 18 for polymer removal.

Figure 3:
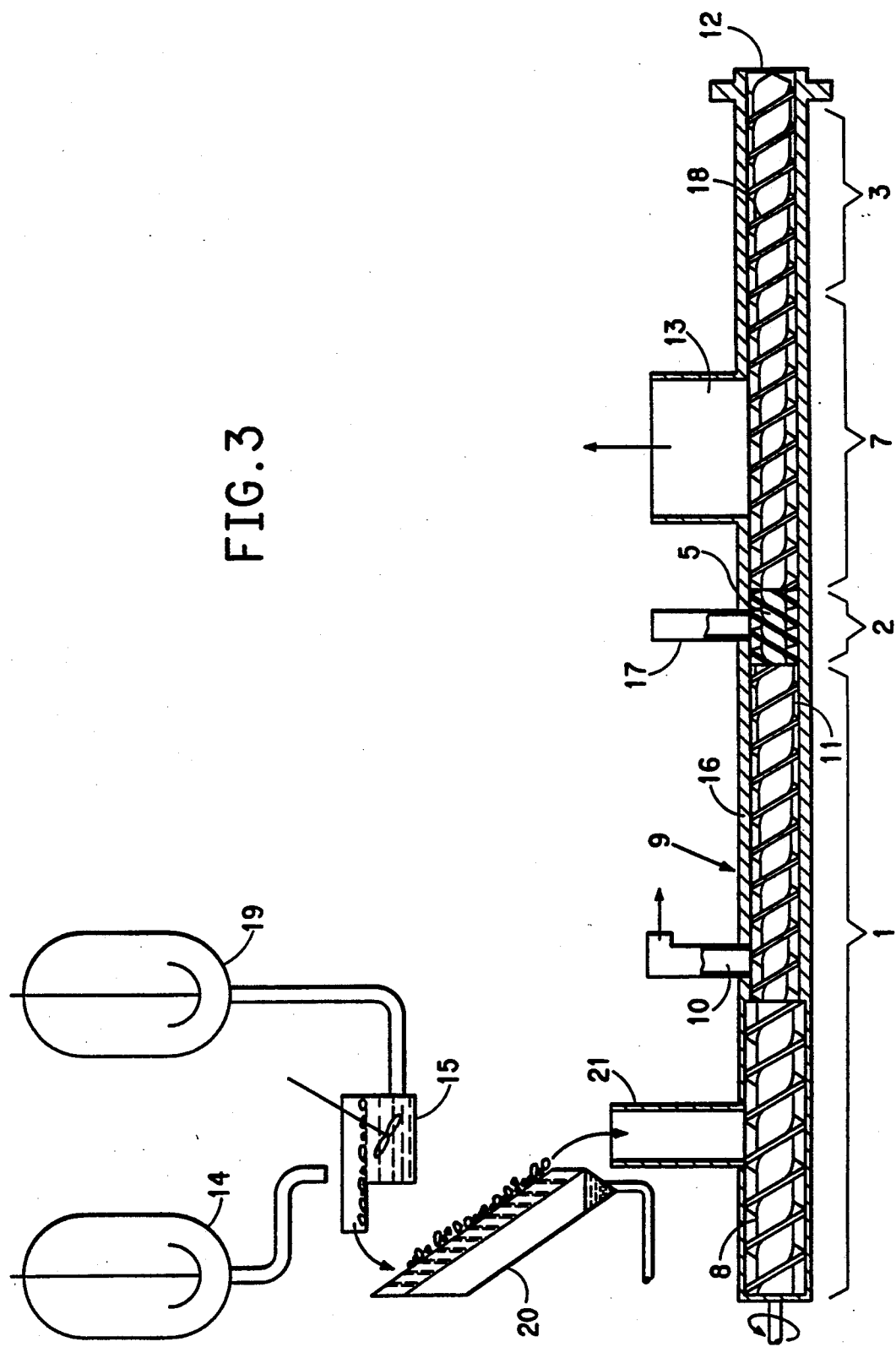
FIG. 3 is a modified embodiment of the dewatering extruder shown in FIG. 1 and FIG. 2 with the addition of a subatmospheric pressure zone and polymer removal zone.

In zone 1 the screw flights transition from intermesh to tangential design. Counter-rotating or co-rotating intermeshing screws offer good venting characteristics. Non-intermeshing screws or a single screw extruder are useful due to low equipment cost relative to multiple screw extruders. The SBR fibrous filler compounded material can be directly expelled or discharged from the extruder assembly shown in FIG. 1 through open or unrestrictive die 12 and air dried by conventional means. Alternatively, as shown in FIG. 3, the extruder can be provided with a subatmospheric pressure zone 7 downstream of pressure seal 5 for removal of remaining liquid from the coagulated SBR by means of a vacuum pump communicating with vacuum port 13. The dried SBR/fiber mixture, typically containing less than 1% moisture, subsequently passes through polymer removal zone 3 and is forced through die 12 and cut into final product form for use. One of the twin screws can be truncated and cylindrical bore sections used for the final zone(s). The polymer removal zone 3 is frequently such a single screw section, superior to a twin screw design in pressure building capability. The drawings are simplified in that they do not show various details obvious to those skilled in the art. For example, the housing 5 is shown without any heat transfer means. Obviously, heating or cooling by means of various fluids circulating through a jacket is possible, as well as use of electric heaters or of heating or cooling coils.

In the operation of one embodiment of the process of this invention, SBR polymer latex and aqueous fibrous filler slurry are mixed under low shear conditions in feed tank 14. The resulting slurry containing SBR latex and fibers are fed to coagulation mixer 15 containing a coagulating agent, e.g., calcium chloride, fed from feed tank 19. The resulting mixture of fiber-filled coagulated SBR latex (coagulum) in the form of crumb and water is fed to dewatering extruder 9 through entrance port 21. The coagulated SBR latex is fed into a dewatering zone and conveyed forward toward the flow restriction, shown as pressure seal 5, which may be, for example, a section of reverse pitch segments of screws as shown, or a section in which clearances between the screws and the housing are reduced to provide a restriction and, therefore, high pressure at the seal. The particular peak pressure depends on the flow rate, restriction design, screw speed and compound viscosity. Water or other liquid separated from the SBR latex is forced back from the pressure seal zone and removed through vent 10 in zone 1. Coagulated SBR passing through the pressure seal contains from about 2-35 weight percent water with the absorptive fibers, such as cotton. The coagulated SBR can be discharged or expelled through the die of the extruder and air dried in conventional equipment such as hot air conveyor driers or drying extruders or some combination thereof to obtain a product having less than 1% moisture. Alternatively, residual water held by the coagulated SBR which passes through the pressure seal can be substantially removed in subatmospheric pressure zone 7, as shown in FIG. 3, maintained at a typical pressure of about 200 mm Hg absolute and operated to give a dried product temperature in excess of about 100° C.

The present invention is illustrated below by the following preferred embodiments wherein all parts, proportions, and percentages are by weight unless otherwise indicated.

Examples

Example 1

48 g chopped cotton fiber, less than 1 mm in length, was added to 1 liter of water to wet out all the cotton, and 650 g of SBR latex, available from BASF as Butanol NS 120-121 PL240 Anionic SBR, and containing 74% non-volatile solids, was added and the ingredients mixed until all streaks of unmixed latex and wetted cotton had been eliminated. The resultant slurry was then fed into the vortex of a mixer in a vessel containing 5 liters of an aqueous 0.5% calcium chloride coagulant to form non-tacky crumbs of coagulated SBR about 6 to 13 mm diameter. Gross water was drained from the SBR latex that was in the form of crumb. The remaining damp crumb of coagulated SBR latex was fed to a dewatering extruder described hereinabove and in the drawing. The dewatering extruder was equipped with counter-rotating twin screws with a centerline-to-centerline separation of 20 mm. A 274 mm length of 24 mm outer diameter intermeshing double-flighted screws was followed by a 356 mm length of 20 mm outer diameter non-intermeshing screws including opposed restrictive shallow flighted sections 30 mm long terminating 30 mm from the end of each screw. The damp crumb of coagulated SBR latex was fed to the dewatering extruder through a port centered 104 mm down the length of the intermeshing screw section. The coagulated SBR latex containing cotton fibers was fed through the flow restriction pressure seal in the dewatering extruder and wastewater, containing some loose fiber, was removed upstream at a rate of 141 ml/min through a 20 mm outer diameter twin screw counter-rotating vent port stuffer centered 328 mm from the start of the intermeshing screws. SBR that passed through the pressure seal contained 7% water. The SBR was extruded as fine, blue crumb from the open barrel discharge die at a rate of 70 dry g/min. Screw speed was 90 rpm with 0.4 kW average drive power. The resultant SBR containing 10 parts fiber per 100 parts rubber can be used in the manufacture of tires or power transmission belts.

Example 2

The procedure described in Example 1 was repeated except as follows. A slurry comprising 72 g KEVLAR® aramid pulp fiber (Merge 6F371, available from E. I. du Pont de Nemours and Company, Inc.) was substituted for the cotton fibers in 2 liters of water. Wastewater, containing a small quantity of loose fibers, was removed through the vent port stuffer at a rate of 237 ml/min while the coagulated SBR containing 6% water was extruded through the open barrel discharge die as a loose, fluffy crumb at a rate of 59 dry g/min. Screw speed was 90 rpm with 0.4 kW average drive power. The resultant fiber-filled SBR containing 15 parts fiber per 100 parts rubber can be used for the manufacture of tires or power transmission belts.

Example 3

The procedure described in Example 1 was repeated except as follows. 384 g of cotton fibers in 2 liters of water was used in the process. Wastewater was removed at a rate of 95 ml/minute while the coagulated SBR containing 16% water was extruded as a crumb at 29 dry g/minute. Screw speed was 90 rpm with 0.2 kW average drive power. The resultant SBR containing 80 parts fiber per 100 parts rubber can be further diluted by the end user in the manufacture of tires or power transmission belts.

Example 4

72 g KEVLAR® aramid pulp fiber, about 0.3 mm long, and 5 liters of water containing 0.5% calcium chloride coagulant were agitated in a mixer to form a slurry. While the slurry was agitated, 650 g of SBR latex was fed into the vortex of the mixer thereby coagulating the SBR in the form of non-tacky crumb. Gross water was drained from the coagulated SBR latex. The remaining damp crumb of coagulated SBR latex was fed to the dewatering extruder described in Example 1. Wastewater, containing a substantial quantity of loose, fluffy solids, was removed at a rate of 174 ml/minute while the coagulated fiber-filled SBR containing 5% water was extruded through an unrestricted die as a loose, fluffy crumb at a rate of 65 dry g/minute. Screw speed was 65 rpm with 0.4 kW average drive power. The resultant SBR containing about 15 parts fiber per 100 parts rubber can be used for the manufacture of tires or power transmission belts.

I claim:

1. A process for incorporating fibrous filler into a styrene-butadiene rubber which comprises:
   a) mixing a styrene-butadiene rubber latex and about 1-400 parts by weight synthetic fibrous filler per 100 parts styrene-butadiene rubber,
   b) contacting the mixture with a coagulant for the styrene-butadiene rubber latex to form a coagulated fiberfilled rubber,
   c) feeding the coagulated fiber-filled styrene-butadiene rubber to a dewatering extruder and through a flow restriction in the extruder that applies back pressure sufficient that water present in the coagulated fiber-filled styrene-butadiene rubber is forced out of a vent provided in the extruder upstream from the flow restriction, and
   d) discharging the fiber-filled coagulated styrene-butadiene rubber from the extruder.

2. A process of claim 1 wherein the synthetic fibrous filler is a polyaramid fiber.

3. A process of claim 2 wherein the polyaramid is poly(paraphenylene terephthalamide).

4. A process of claim 1 wherein the coagulated fiber-filled styrenebutadiene rubber exiting the flow restriction is fed to a subatmospheric pressure zone to remove additional water form the styrene-butadiene rubber to substantially dry the rubber before it is discharged from the extruder.

5. A process of claim 1 wherein the fibrous filler is added as an aqueous slurry.

* * * * *